Figure 1:
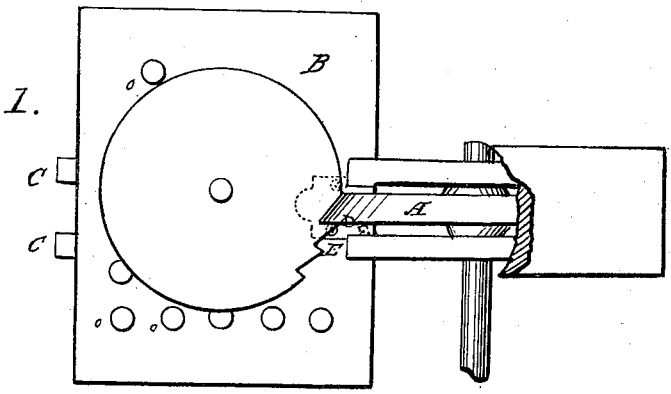

A. Bartlett.
Saw Sharpener.

N° 89,006. Patented Apr. 20, 1869.

Witnesses:
Richard Smith

Inventor:
Austin Bartlett
by his att'ys
Gardiner & Hyde

United States Patent Office.

AUSTIN BARTLETT, OF CHESTER, MASSACHUSETTS.

Letters Patent No. 89,006, dated April 20, 1869.

IMPROVEMENT IN SAW-SHARPENER.

The Schedule referred to in these Letters Patent and making part of the same.

*To all whom it may concern:*

Be it known that I, AUSTIN BARTLETT, of Chester, Hampden county, State of Massachusetts, have invented a new and useful Machine for Retoothing Saws; and I do hereby declare that the following is a full and clear description thereof, reference being had to the accompanying drawings, and to the letters of reference marked thereon.

In the drawings—

Figure 1 is a plan view, and

Figure 2:
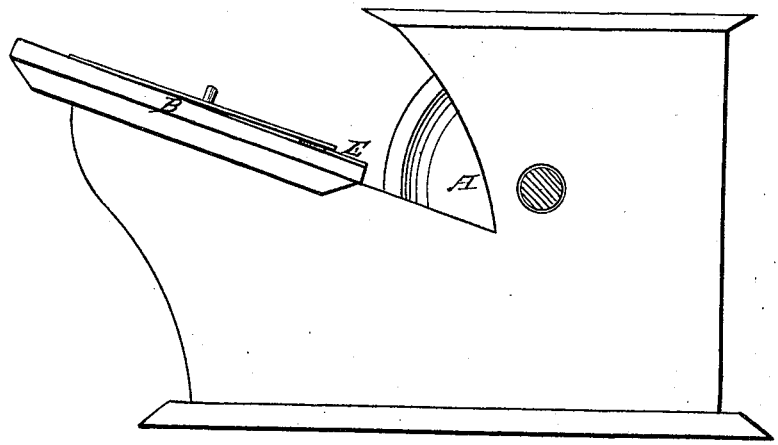

Figure 2 a side view of my machine.

Similar letters of reference denote similar parts thereof.

The object of my invention is to produce a machine which will quickly and perfectly retooth a saw, whether straight or circular, without danger of bending the same, and without case-hardening it in the operation.

Ordinarily, this has been done with burrs, and is an expensive and uncertain operation by this means, for besides the risk of buckling or crimping the saw, a great many burrs have to be used, and often, in case of a very hard saw, it is nearly impossible, the burr wearing as fast as the saw; besides this, it being impossible to keep the burr cool, the saw is case-hardened, and it requires much labor to file it down to the proper metal.

In my device, I use a grindstone, of the proper thickness, and of a shape at the perimeter corresponding to the shape of the notches required in the saw. This is set upon a shaft, in bearings, and is turned by crank or belt, as may be most convenient.

A table, B, sliding upon an inclined guide, C, is arranged for the saw to be placed upon, and this table has at its edge a notch, D, cut, which is at the part of the table nearest the grindstone A.

This notch D is faced upon the top, with a plate, of metal, E, corresponding in shape to the notch to be cut in the saw.

It will be necessary, in the arrangement of the table and guide, to consider the size of the grindstone, as the inclination of the former is varied slightly in different cases. In the drawings, it is shown that the plane of the table, if continued, would fall below the centre of the grindstone-shaft. This is always desirable, as the saw is thus held steadily in place, the stone grinding downward, and pressing its edge against the plate E on the table.

A number of sockets, *o o o*, is cut through the table, so that various-sized circular-saws may be centred and ground.

The operation of grinding a saw by my machine is simple, and as follows:

If a circular-saw, it is centred in one of the sockets *o*, and the table gently pushed down until the notch of the saw comes against the perimeter of the grindstone. When this notch is ground sufficiently, the table is drawn far enough back to clear the saw, when the latter is revolved enough to bring another tooth in position. Water must play upon the grindstone continually, as in ordinary cases of grinding.

I thus obtain an important result with little expense of labor and material, completely obviating the great difficulties of this heretofore-troublesome operation.

Now, having described my invention,

What I claim as new, and desire to secure by Letters Patent, is—

The arrangement of the slide-table B, moving on a plane inclined below the centre of the grindstone-shaft, in combination with the grindstone A, the parts being constructed in the manner shown and for the purpose specified.

AUSTIN BARTLETT.

Witnesses:
EDWARD H. HYDE,
J. B. GARDINER.